Figure 1:
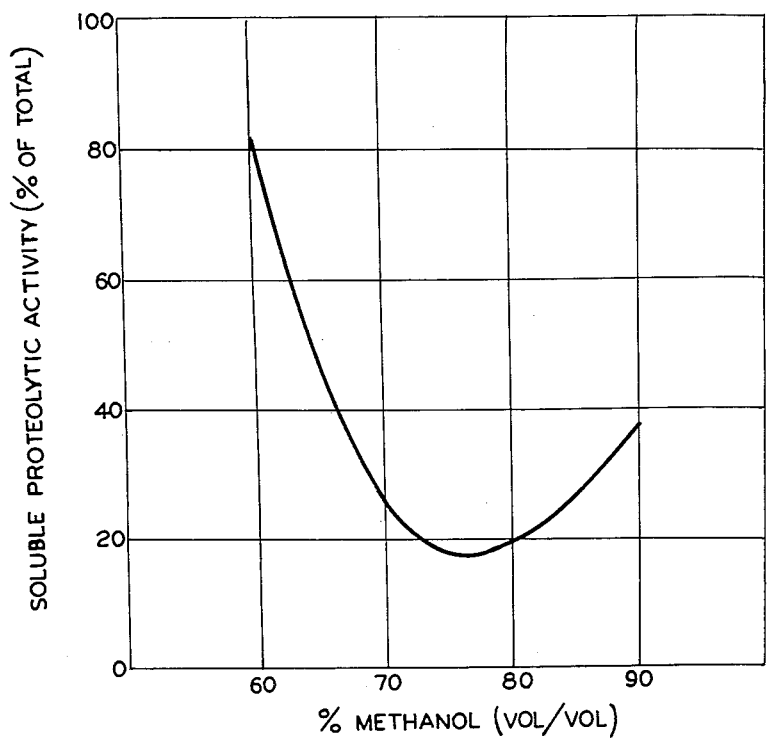

INVENTOR
ALEX LESUK

United States Patent Office 3,011,952
Patented Dec. 5, 1961

3,011,952
PROCESS FOR THE PURIFICATION
OF PAPAIN
Alex Lesuk, Bethlehem, N.Y., assignor to Sterling Drug Inc., New York, N.Y., a corporation of Delaware
Filed July 30, 1958, Ser. No. 751,959
8 Claims. (Cl. 195—66)

This invention relates to a process for purifying papain.

Crude papain, obtained as the dried exudate of the fruit and leaves of Carica papaya L., Caricaceae, is usually found to have been contaminated during collection, drying, or storage by insects, rodent hair and excreta, botanical plant parts, sand, etc. and may thereby become further contaminated by harmful bacteria and enteric organisms.

Heretofore papain has been purified by dispersing the crude enzymes in water, filtering and spray-drying. In this procedure, however, the soluble contaminants are retained in the dried product. It has also been known to purify papain by dispersing it in water and adding acetone to reprecipitate the enzymes leaving many of the acetone-soluble and water-soluble impurities in the supernatant liquid. The material thus purified possesses a very disagreeable sulfide-like taste probably due to the reaction between the acetone and reactive sulfhydryl groups present in the papaya latex.

It has now been found that an enzyme mixture of high purity which contains none of the objectionable sulfide-like taste can be obtained by dispersing the crude enzymes in water, adding a quantity of a water-miscible lower-alkanol to the incipient precipitation point of the proteolytic enzymes thereby retaining the maximum proteolytic activity (i.e., the maximum amount of the proteolytic enzymes) in the solvent phase while precipitating the major portion of the lower-alkanol insoluble contaminants, removing the lower-alkanol insoluble contaminants and precipitated inert materials, for example by filtration or centrifugation, and then adding an additional quantity of the water-miscible lower-alkanol sufficient to precipitate the proteolytic enzymes. The amount of lower-alkanol added in order to retain the maximum amount of the proteolytic enzymes in the solvent phase at the incipient precipitation point of the enzymes and the amount of the lower-alkanol added later to precipitate the maximum amount of the proteolytic enzymes are critical but can be readily determined by experimentation as will be described later.

It is preferred that the incipient precipitation point be so chosen that economically insignificant quantities of proteolytic enzymes are precipitated, that is less than about 15% of the proteolytic activity is thrown out of solution. In general, the concentration of lower-alkanol in the final mixture from which a major proportion of the enzymes are precipitated should be in the approximate range of 40%–80% (volume/volume basis). By proper choice of the amount of lower-alkanol added, from 80%–100% of the proteolytic activity is recovered in the reprecipitated papain.

The use of lower-alkanols in my process has the further advantage of providing an antibacterial effect so that harmful bacteria present are destroyed.

The lower-alkanols that may be used in my process are methanol, ethanol, n-propanol, 2-propanol and 2-methyl-2-propanol. Preferred lower-alkanols are ethanol and 2-propanol. Obviously, aqueous lower-alkanols can also be used in practising my invention. It is only necessary to know the concentration of lower-alkanol in the aqueous solution to be added and from this calculate the amount of aqueous lower-alkanol required to produce the critical concentrations of lower-alkanol at the incipient precipitation point and in the final mixture from which the enzymes are precipitated.

In order to precipitate the maximum proteolytic activity in the purified enzyme, it is advantageous to determine first the optimum concentration of lower-alkanol to use in order to achieve this end. The method of determining the optimum concentration of lower-alkanol is illustrated by the following procedure where the lower-alkanol is methanol. The procedure is applicable to other water-miscible lower-alkanols.

To aliquot portions of a dispersion of 100 g. of crude papain in 120 ml. of water at 24° C. were added varying amounts of methanol to yield various solvent concentrations in the range of 60% to 90% methanol (volume/volume basis) in the solvent phase. After equilibration for one hour at 24° C., the respective precipitates were isolated and the proteolytic activity of the precipitated enzymes was determined quantitatively for each. The non-precipitated activity for each sample was then obtained by difference and the non-precipitated activity plotted graphically as ordinate against volume percent methanol as abscissa.

FIG. 1 shows the curve obtained in this manner for methanol. The minimum point of the curve gives the optimum concentration of methanol in water necessary to precipitate the maximum proteolytic activity. As can be seen from FIG. 1, a major proportion of the proteolytic activity is precipitated at methanol concentrations in the range of 70–80 volume percent, the maximum activity (84.5%) being precipitated at 75.5 volume percent. FIG. 1 also shows that the concentration of methanol necessary to retain the maximum proteolytic activity in solution (the incipient precipitation point) is less than 60% methanol. I have found that 55% aqueous methanol is the preferred concentration for this purpose.

Figure 2:
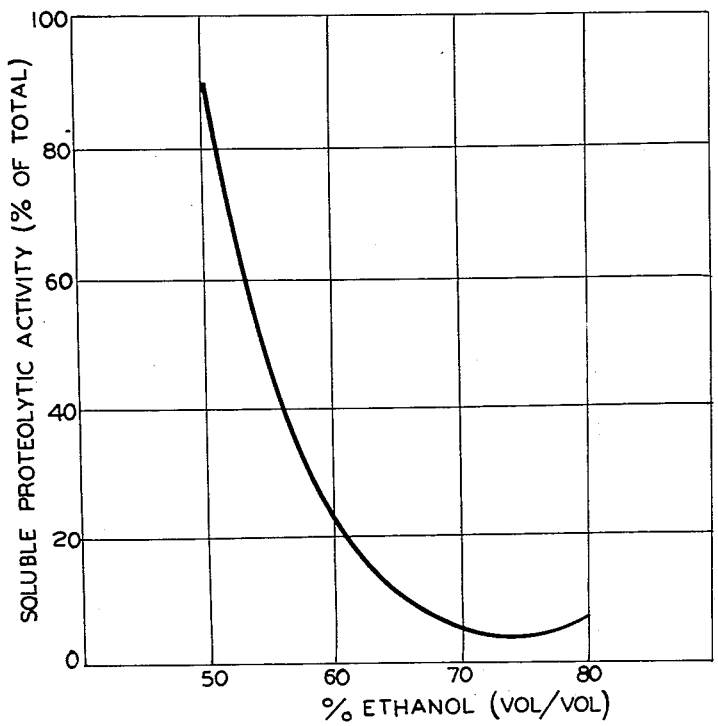

Curves can be obtained in like manner for any other water-miscible lower-alkanol. FIG. 2 shows the curve obtained for ethanol. From FIG. 2 it can be seen that a major proportion of the proteolytic activity is precipitated by ethanol concentrations in the range of 60–80 volume percent, 95% of this activity being precipitated from 70% ethanol. FIG 2 also shows that the concentration of ethanol necessary to retain the maximum proteolytic activity in solution (the incipient precipitation point) is less than or equal to 50%. However, since the slope of the curve at this point is so great, and even a slight increase in ethanol concentration over 50% would result in the precipitation and loss of a significant quantity of enzymes, I prefer to use a concentration of ethanol somewhat less than 50%. An ethanol concentration of 47.5% is the preferred one.

Figure 3:
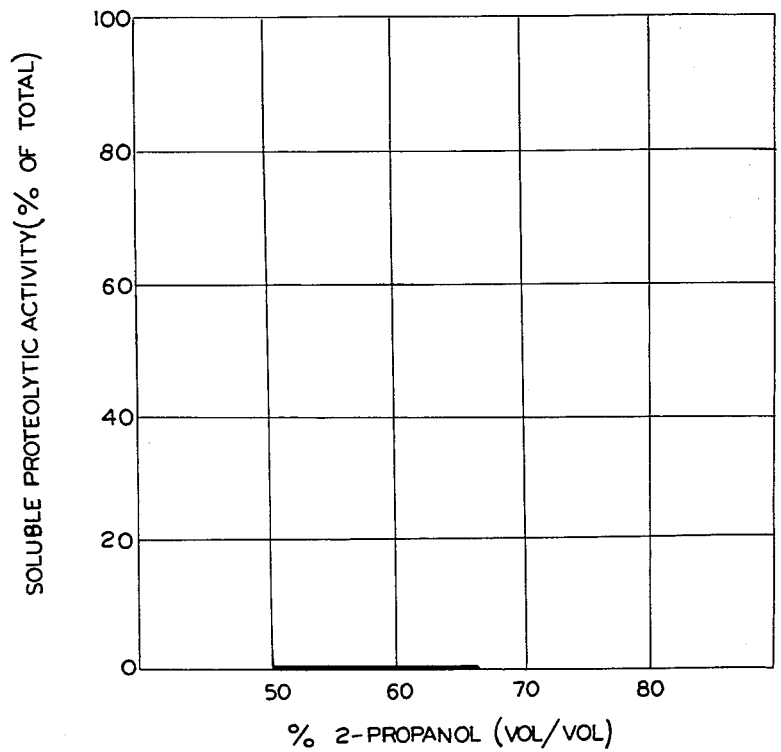

FIG. 3 shows a plot of similar data obtained with 2-propanol. Reference to FIG. 3 shows that 2-propanol precipitates the proteolytic activity quantitatively at 2-propanol concentrations in the range of 50–66.6 volume percent. Since papain is insoluble in such a broad range of 2-propanol concentrations, it is necessary to use a slightly different process with this solvent.

The crude papain can be purified using 2-propanol by dispersing the crude papain in an aqueous medium, precipitating the major proportion of the proteolytic activity by adding a quantity of 2-propanol to provide a 2-propanol concentration of from 40–80 volume percent in the solvent phase, separating the precipitated enzymes from the solvent phase containing the 2-propanol soluble contaminants, redispersing the enzymes containing the insoluble contaminants in an aqueous medium, removing the insoluble contaminants, for example by filtration or centrifugation, reprecipitating the major proportion of the proteolytic activity by adding a quantity of 2-propanol to provide a 2-propanol concentration of from 40–80 volume percent in the solvent phase, and isolating the purified enzymes. Alternatively, the enzymes can be redispersed in water and isolated by spray-drying.

Obviously, this same purification process can be used with other water-miscible lower-alkanols since it merely requires that a major proportion of the proteolytic activity be precipitated from an aqueous lower-alkanol solution and thereby separated from the major portion of the lower-alkanol soluble contaminants first. The two processes are, therefore, equivalent and merely differ in the order in which the soluble and the insoluble contaminants are removed. The preferred concentration of the lower-alkanol to use in either process in order to precipitate the major proportion of the proteolytic activity can be readily determined by experimentation.

Furthermore, it is also obvious that, when using the process described above for methanol and ethanol, instead of dispersing the crude enzymes in water alone and then adding a lower-alkanol to the incipient precipitation point of the enzymes, one can achieve the same result by initially dispersing the crude enzymes in an aqueous solution of a water-miscible lower-alkanol whose concentration has been adjusted to the incipient precipitation point of the enzymes thereby retaining the maximum proteolytic activity in the solvent phase while leaving undissolved the major portion of the lower-alkanol insoluble contaminants as before. These two procedures are, therefore, to be considered equivalent and differ only in that in one instance the lower-alkanol concentration is adjusted to the predetermined incipient precipitation point after dispersion of the enzymes and in the other instance before dispersion of the enzymes.

It has been found that papain purified in the manner described above can be effectively stabilized and activated by incorporation of from 0.05% to 5% of a water-soluble salt of cysteine. It is preferred to use about 1% of cysteine hydrochloride. The cysteine used in the purification steps also is useful in removing ions of heavy metals from the water used in the dispersion medium.

The following examples illustrate the method of carrying out my invention without the latter being limited thereto.

*Example 1*

One hundred grams of crude papain were stirred with 120 ml. of 0.01 M cysteine hydrochloride for one hour during which time the papain was completely dispersed. To the dispersion was added slowly and with vigorous stirring 147 ml. of methanol. The mixture, which contained 55% methanol by volmue, was stirred for about thirty minutes and centrifuged and the clear supernatant liquid was removed and saved. The precipitate was washed with 50 ml. of 55% aqueous methanol, and the mixture was centrifuged again. The precipitate containing the undesirable, insoluble contaminants was discarded, and the clear wash liquid was combined with the main supernatant. To the combined clear supernatant liquid was added slowly and with vigorous stirring 265 ml. of methanol to give a mixture containing 75.5% methanol by volume. The enzymes were precipitated as a taffy-like gum which was isolated by decantation of the supernatant liquid containing the undesirable, soluble contaminants and tray-drying. Alternatively, the precipitated enzymes can be redissolved in pure water and spray-dried. Sufficient cysteine hydrochloride can be incorporated in the water so as to provide a cysteine hydrochloride content of from 0.05% to 5% by weight in the dried product. The enzymes thus obtained possess 84.5% of the total proteolytic activity of the starting material.

*Example 2*

One hundred grams of crude papain were stirred with 120 ml. of 0.01 M cysteine hydrochloride for one hour during which time the papain was completely dispersed. To the dispersion was added slowly and with good stirring 133.3 ml. of 95% ethanol to give a mixture containing 50% ethanol by volume. The mixture was stirred for thirty minutes, and then 13.3 ml. of water was added. The mixture, which now contained 47.5% ethanol by volume, was stirred for fifteen minutes, centrifuged and the clear supernatant liquid removed and saved. The precipitate was washed with 50 ml. of 47.5% aqueous ethanol and the mixture centrifuged again. The precipitate containing the undesirable, insoluble contaminants was discarded, and the clear wash liquid was combined with the main supernatant. To the combined clear supernatant was added with stirring 285.4 ml. of 95% ethanol to give a mixture containing 70% ethanol by volume. The proteolytic enzymes were precipitated as a soft, taffy-like gum. The supernatant, containing the undesirable, soluble contaminants, was decanted leaving the purified papain.

The gum thus obtained can be tray-dried and broken up or redispersed in pure water and spray-dried. Sufficient cysteine hydrochloride can be incorporated in the water so as to provide a cysteine hydrochloride content of from 0.05% to 5% by weight in the dried product. The material possesses 91% or more of the total proteolytic activity of the starting material.

*Example 3*

One hundred grams of crude papain were stirred for one hour with 120 ml. of 0.01 M cysteine hydrochloride during which time the papain was completely dispersed. To the dispersion was added 240 ml. of 2-propanol with stirring. The mixture, which contained 66.6 volume percent 2-propanol, was stirred for thirty minutes. The gum was allowed to settle for thirty minutes and the supernatant liquid containing the undesirable, soluble contaminants was decanted. The pockets of supernatant liquid entrapped within the gum were liberated by tilting the container from side to side and by agitation with a stirring rod. The liquid thus released was decanted and the gum washed as follows. The gum was once more dispersed in 40 ml. of 0.01 M cysteine hydrochloride with stirring and 80 ml. of 2-propanol added with stirring. Stirring was continued for fifteen minutes, the gum was allowed to settle and the supernatant liquid decanted as before. The washing procedure was repeated once again, and the gum was dispersed once more in sufficient 0.01 M cysteine hydrochloride to provide a cysteine hydrochloride content of from 0.05% to 5% based on the weight of papain used. The dispersion was filtered through a relatively coarse screen (80–90 mesh) and then through a 200 mesh screen to remove the insoluble, particulate contaminants. The filtrate was then spray-dried. The material thus obtained possesses 97.5% or more of the total proteolytic activity of the starting material.

I claim:

1. The process for purifying papain which comprises dispersing crude papin in an aqueous solution of a water-miscible lower-alkanol whose concentration has been adjusted to the incipient precipitation point of the enzyme thereby retaining the maximum proteolytic activity in the solvent phase while leaving undissolved the major portion of the lower-alkanol insoluble contaminants, removing the insoluble contaminants, adding an additional quantity of a water-miscible lower-alkanol sufficient to precipitate the major proportion of the proteolytic activity and separate it from the soluble contaminants, and isolating the purified papain.

2. The process for purifying papain which comprises dispersing crude papain in an aqueous solution of methanol whose concentration has been adjusted to the incipient precipitation point of the enzyme thereby retaining the maximum proteolytic activity in the solvent phase while leaving undissolved the major portion of the methanol insoluble contaminants, removing the insoluble contaminants, adding an additional quantity of methanol to provide a methanol concentration of from 70 to 80 volume percent in the final mixture thereby precipitating the major proportion of the proteolytic activity and separating it from the soluble contaminants, and isolating the purified papain.

3. The process for purifying papain which comprises dispersing crude papain in an aqueous solution of ethanol whose concentration has been adjusted to the incipient precipitation point of the enzyme thereby retaining the maximum proteolytic activity in the solvent phase while leaving undissolved the major portion of the ethanol insoluble contaminants, removing the insoluble contaminants, adding an additional quantity of ethanol to provide an ethanol concentration of from 60 to 80 volume percent in the final mixture thereby precipitating the major proportion of the proteolytic activity and separating it from the soluble contaminants, and isolating the purified papain.

4. The process for purifying papain which comprises dispersing crude papain in an aqueous medium, adding a quantity of methanol to the incipient precipitation point of the proteolytic enzymes thereby retaining the maximum proteolytic activity in the solvent phase while precipitating the major portion of the lower-alkanol insoluble contaminants, removing the insoluble contaminants, adding an additional quantity of methanol to provide a methanol concentration of 75.5 volume percent in the final mixture thereby precipitating the maximum proteolytic activity and separating it from the soluble contaminants, and isolating the purified papain.

5. The process for purifying papain which comprises dispersing crude papain in an aqueous medium, adding a quantity of ethanol to the incipient precipitation point of the proteolytic enzymes thereby retaining the maximum proteolytic activity in the solvent phase while precipitating the major portion of the lower-alkanol insoluble contaminants, removing the insoluble contaminants, adding an additional quantity of ethanol to provide an ethanol concentration of 70 volume percent in the final mixture thereby precipitating the maximum proteolytic activity and separating it from the soluble contaminants, and isolating the purified papain.

6. The process for purifying papain which comprises dispersing crude papain in an aqueous medium, adding a quantity of a water-miscible lower-alkanol sufficient to precipitate the major proportion of the proteolytic activity, separating the precipitated enzymes from the solvent phase containing the lower-alkanol soluble contaminants, redispersing the enzymes in an aqueous medium, removing the insoluble contaminants, adding a quantity of a water-miscible lower-alkanol sufficient to reprecipitate the major proportion of the proteolytic activity, and isolating the purified papain.

7. The process for purifying papain which comprises dispersing crude papain in an aqueous medium, precipitating the major proportion of the proteolytic activity by adding a quantity of 2-propanol to provide a 2-propanol concentration of from 40 to 80 volume percent in the solvent phase, separating the precipitated enzymes from the solvent phase containing the 2-propanol soluble contaminants, redispersing the enzymes in an aqueous medium, removing the insoluble contaminants, reprecipitating the major proportion of the proteolytic activity by adding a quantity of 2-propanol to provide a 2-propanol concentration of from 40–80 volume percent in the solvent phase, and isolating the purified papain.

8. The process for purifying papain which comprises dispersing crude papain in an aqueous medium, precipitating the maximum proteolytic activity by adding a quantity of 2-propanol to provide a 2-propanol concentration of from 50 to 66.6 volume percent in the solvent phase, separating the precipitated enzymes from the solvent phase containing the 2-propanol soluble contaminants, redispersing the enzymes in an aqueous medium, removing the insoluble contaminants, reprecipitating the maximum proteolytic activity by adding a quantity of 2-propanol to provide a 2-propanol concentration of from 50 to 66.6 volume percent in the solvent phase, and isolating the purified papain.

References Cited in the file of this patent

UNITED STATES PATENTS 1,959,750    Wada                May 22, 1934

OTHER REFERENCES

"Enzymes" by Waksman et al.: The Williams and Wilkins Co., Baltimore (1926), page 224.

Journal of Biological Chemistry, vol. 135 (1940), pp. 761–773.

"The Chemistry and Technology of Enzymes," by Tauber, John Wiley and Sons, Inc. New York (1949), pp. 160–161.

Kimmel et al.: Journal of Biological Chemistry, vol. 207, pp. 515–531 (1954).

Methods in Enzymology, vol. 1, pp. 87–90 (1955), Academic Press, New York.